May 6, 1941.   W. K. SONNEMANN ET AL   2,240,677

PROTECTIVE RELAY

Filed Oct. 22, 1938

WITNESSES:
E. F. Oberheim.
Thur. C. Groome

INVENTORS
William K. Sonnemann and
William A. Lewis, Jr.
BY
ATTORNEY

Patented May 6, 1941

2,240,677

UNITED STATES PATENT OFFICE 2,240,677

PROTECTIVE RELAY

William K. Sonnemann, Newark, N. J., and William A. Lewis, Jr., Wilkinsburg, Pa., assignors to Westinghouse Electric & Manufacturing Company, East Pittsburgh, Pa., a corporation of Pennsylvania Application October 22, 1938, Serial No. 236,397

17 Claims. (Cl. 175—294)

This invention relates to protective relays, and it has particular relation to protective relays of the ratio or percentage differential type.

It has been customary in the past to provide ratio or percentage differential relays with a substantially straight or linear characteristic. That is, the differential relay designed to protect apparatus against the occurrence of an internal fault is designed to operate when the ratio of the internal fault current to the load or through current exceeds a predetermined ratio. With the designs heretofore available, the same operating characteristics are obtained for total currents far greater than full load currents. From a practical standpoint, such performance is undesirable because of the difficulty in providing perfectly matched current transformers for energizing the differential relay. If the current transformers employed are slightly dissimilar, an operating current flows through the differential relay despite the fact that no internal fault may be present in the apparatus protected by the relay. For normal current ranges, this difference current may not be appreciable, but for excessive currents, such as those occurring under external fault conditions, the difference between the current transformers may become greatly magnified and sufficient current may pass through the operating winding of the differential relay to cause undesired actuation thereof. If the sensitivity of the relay is altered to prevent operation under the influence of these excessive currents, the protection afforded by the relay under normal current conditions is greatly reduced. Even with similar transformers, a condition of unbalance may be obtained under some conditions in multi-terminal system protection because of the saturation of one current transformer carrying a larger current than other transformers.

In order to provide sensitive operation over normal current ranges and still prevent undesired actuation under excessive through current conditions, we design a ratio differential relay with what may be termed a "flared" characteristic. That is, the ratio of the difference current required to operate our relay to the through or load current, is made substantially constant over the normal current ranges of the apparatus to be protected, but on higher current ranges this ratio is increased appreciably to afford greater protection against undesired operation of the relay.

It is accordingly, an object of our invention to provide a ratio differential relay which is sensitive over the normal operating ranges of apparatus to be protected and relatively insensitive over higher current ranges.

It is another object of our invention to provide a ratio-differential relay having an operating winding which becomes less efficient as the energization thereof increases.

It is still another object of our invention to provide a ratio-differential relay having an operating winding and a magnetic member associated therewith, said magnetic member being designed to operate with decreasing permeability when the current passing through said operating winding exceeds a predetermined operating range.

Further objects of our invention will be apparent from the following description taken in conjunction with the accompanying drawing, in which.

Figure 1:
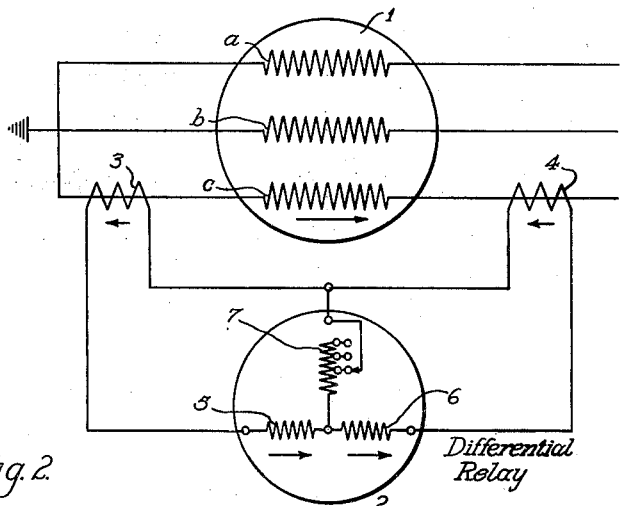
Figure 1 is a diagrammatic view of a ratio-differential relay installation.

Referring to the drawing, Fig. 1 shows an electrical apparatus or system 1 to be protected by a ratio-differential relay 2. For example, the apparatus 1 may be a three-phase generator having phase windings $a$, $b$ and $c$. For simplicity, protection will be described for phase winding $c$ of the generator.

In order to energize a ratio-differential relay a pair of current transformers 3 and 4 are provided, one being installed in the phase $c$ on each side of the phase winding. The current transformer 3 is connected to a restraint winding 5 of the differential relay 2 and the current transformer 4 has its secondary connected to a restraint winding 6 of the differential relay. As illustrated, these connections include a common operating winding 7 of the differential relay. Under normal operating conditions, the currents in the secondaries of the current transformers 3 and 4 are approximately equal so that although this current flows through the restraint windings 5 and 6, no current flows through the operating winding 7. If an internal fault occurs in the phase winding $c$, the currents in the secondary windings of the transformers 3 and 4 no longer are equal and a difference current flows through the operating winding 7, which actuates the differential relay.

Figure 5:
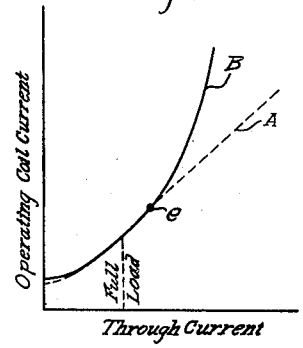
Fig. 5 is a graph showing operating curves for ratio-differential relays.

The ratio-differential relay heretofore available has been designed with an operating characteristic similar to that represented by the curve A of Fig. 5, in which abscissae represent through current and ordinates represent operating current required to actuate the ratio-differential relay. As shown by this curve, the characteristics heretofore given to ratio-differential relays is substantially a straight line, the slight variation adjacent the zero position being caused by a spring or weight employed for biasing the differential relay in an open position. With a relay designed to operate with a 5% sensitivity, for example, the same sensitivity would be obtained for all through currents whether small or several times full load. By 5% sensitivity, we mean that the relay is designed to operate for an internal fault which carries 5% of the through or load current. If the current transformers 3 and 4 are slightly unbalanced, and exact balance is difficult to obtain, the operating current caused by this unbalance may be insufficient for actuating the relay during normal operation of the system being protected. But when excessive current flows through the system, such as that caused by an external fault, the unbalance of the current transformers may be accentuated still further, and the ratio of operating current to through current may rise to a value sufficient for actuating the relay.

In order to prevent such operation, we have designed a relay with an operating characteristic similar to that represented by the curve B in Fig. 5. As shown by this curve, the ratio of operating current to load or through current is substantially constant over the intended operating range of the ratio-differential relay, which is the range adjacent and below the full load point of the curve. For higher ranges, however, the curve B indicates that the ratio of operating current to through current increases, and, consequently, the relay is comparatively insensitive over the higher current ranges corresponding to the currents encountered upon the occurrence of external faults. With such a characteristic the relay may be adjusted to be extremely sensitive over the normal operating range without fear of improper actuation under the influence of heavy external fault currents.

Figure 2:
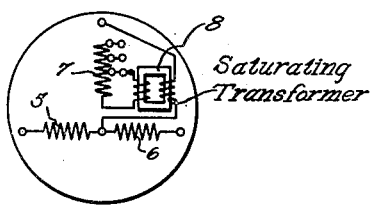
Fig. 2 is a diagrammatic view of a ratio-differential relay embodying our invention.

The desired characteristics of the ratio-differential relay may be obtained in various ways. In Fig. 2, for example, we have illustrated a relay corresponding to that shown in Fig. 1, with the addition of a saturating transformer 8 for energizing the operating winding 7 of the ratio-differential relay. This transformer is designed to have substantially a linear output over the normal operating range of the ratio-differential relay as exemplified by the portion below the point e of the characteristics shown in Fig. 5. When the operating current exceeds the value represented by the point e on the curves, the transformer 8 is designed to operate with decreasing permeability so that a predetermined increase in current flowing through the primary of the transformer is accompanied by a relatively smaller increase in the current output of the secondary of the transformer which is connected across the operating winding 7. A ratio-differential relay of this type will have a characteristic corresponding to that represented by the curve B of Fig. 5.

Figure 3:
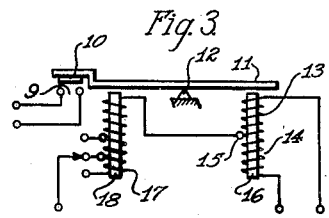
Fig. 3 is a diagrammatic view of a standard form of ratio-differential relay.

Referring to Fig. 3, we have illustrated a ratio-differential relay of a standard high-speed type. In this differential relay a pair of contacts 9 are positioned to be engaged by a contact member 10 carried by a magnetic arm 11, which is pivoted about a point 12. A pair of restraint windings 13 and 14 having a common terminal 15, are mounted on a magnetic core 16 and when energized, tend to rotate the arm 11 in a clockwise direction to separate the contact member 10 from the contacts 9. An operating winding 17 is mounted on a magnetic core 18 which when energized, tends to rotate the magnetic arm 11 in a counter-clockwise direction to engage the contacts 9. In order to provide the relay illustrated in Fig. 3 with a flared operating characteristic similar to that depicted by curve B in Fig. 5, a saturating transformer similar to the transformer 8 shown in Fig. 2 may be employed for energizing the operating winding 17. The desired characteristics also may be obtained by designing the core 18 of the operating winding to operate with decreasing permeability as the operating current increases. Operation of this relay may be improved by making the restraining force more uniform in any conventional manner, as by providing the core 16 with a shading coil to prolong the restraining force or the windings 13, 14 may be mounted on separate cores each provided with a shading coil.

Figure 4:
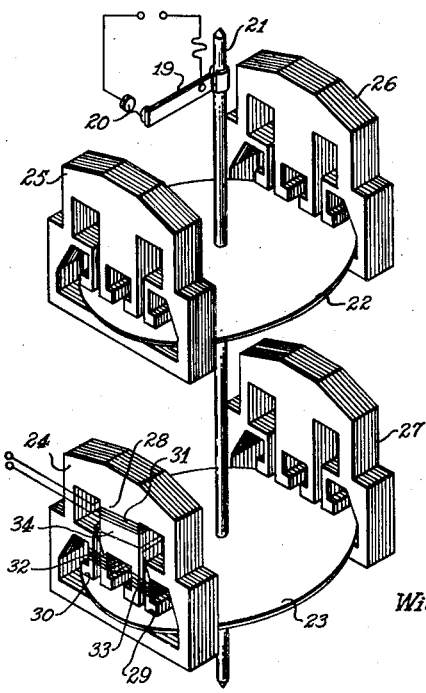
Fig. 4 is a view in perspective of another form of ratio-differential relay.

In the ratio-differential relay illustrated in Fig. 4, a rotatable armature is employed for actuating an arm 19 to engage and separate a pair of contacts 20 which may control a trip circuit. The armature assembly includes a shaft 21 which carries two electro-conductive discs 22 and 23. The movements of the armature assembly are controlled by means of a plurality of electromagnets 24, 25, 26 and 27. Each of these electromagnets includes a main pole 28 and auxiliary poles 29 and 30. The electromagnet 24 is energized by means of an energizing winding 31 which is mounted on the main pole 28. Auxiliary windings 32 and 33 are provided on the auxiliary poles for producing a flux differing in time phase from the flux produced by the main energizing winding 31. These auxiliary windings are energized from a winding 34 on the main pole 28, which in turn, is energized through transformer action from the energizing winding 31. The windings on the electromagnet 24 are so arranged that when energized, they tend to rotate the armature assembly to engage the contacts 20. Similar windings are provided on the electromagnets 25, 26 and 27 but these windings are so arranged that they tend to rotate the armature assembly in a direction separating the contacts 20. The energizing winding on the electromagnet 24 may be termed an operating winding, whereas the windings on the electromagnets 25, 26 and 27 may be termed restraint windings corresponding to the operating and restraint windings illustrated in Figs. 1, 2 and 3.

In order to provide the relay shown in Fig. 4 with an operating characteristic, similar to that depicted by the curve B in Fig. 5, the operating winding 31 may be energized through a saturating transformer similar to the transformer 8 shown in Fig. 2. Another method of accomplishing the same results without the use of a saturating transformer comprises designing the electromagnet 24 to operate with decreasing permeability when the current passing through the energizing winding 31 exceeds a predetermined value. If the cores carrying the restraint windings tend to operate with decreasing permeability in the higher current ranges, the electromagnet 24 may be designed to have its permeability decrease at a faster rate in order to obtain the desired flared characteristic. Although three restraint windings are employed for the relay shown in Fig. 4, it is obvious that other combinations may be employed. For example, only two of the restraint electromagnets of Fig. 4 may be employed for protecting certain circuits.

Although we have described our invention with reference to certain specific circuit arrangements and apparatus, it is apparent that numerous modifications thereof are possible. Therefore, we do not wish our invention to be restricted except as required by the appended claims when interpreted in view of the prior art.

We claim as our invention:

1. In a protective electrical system, operating means energized in accordance with the difference between two variable quantities, restraining means energized in accordance with the sum of said quantities for opposing said operating means, said means being so proportioned that the efficiency of said restraining means relative to that of said operating means is greater for large values of said quantities than for smaller values thereof.

2. In a protective electrical system, a circuit, control means, and actuating means responsive to the difference between current entering and leaving said circuit for actuating said control means, said actuating means being proportioned to provide a ratio of the difference in said currents necessary for actuating said control means to the sum of said current which is greater for a high value of said sum than for a lower value thereof.

3. In a protective electrical system, a circuit, control means, means responsive to the difference between current entering and leaving said circuit for actuating said control means, means responsive to the sum of said currents for opposing actuation of said control means, said actuating and opposing means being proportioned to provide a ratio of the difference in said currents necessary for actuating said control means to the sum of said currents which is greater for a high value of said sum than for a lower value thereof.

4. In a protective arrangement for an electrical system having a plurality of terminals, a differential relay comprising operating means energized in accordance with currents flowing through faults occurring within the system, and restraint means responsive to currents flowing through said terminals for opposing operation of said operating means, said means being proportioned to provide an efficiency of said restraint means relative to that of said operating means which is higher at high values of said currents than at lower values thereof.

5. In a protective arrangement for an electrical system having a plurality of terminals, and a differential relay comprising operating means energized in accordance with currents flowing through faults occurring within the system, and restraint means responsive to currents flowing through said terminals for opposing operation of said operating means, said operating means being designed to have a lower efficiency for a high value of energization than for a lower value thereof.

6. In a protective arrangement for an electrical system having a plurality of terminals, a current transformer associated with each of said terminals, and a differential relay comprising operating means energized from said current transformers in accordance with current flowing through faults occurring within said system, and restraint means responsive to currents derived from said current transformers for opposing operation of said operating means, said operating means including saturating transformer means for providing an efficiency of said restraint means relative to that of said operating means which is higher at high values of said currents than at lower values thereof.

7. In a differential relay, a plurality of restraint windings, and an operating winding connected for energization in accordance with the difference in currents traversing said restraint windings, said relay being proportioned to require a ratio of the energization of said operating winding to the energization of said restraint windings necessary to effect a predetermined operation of said relay which is higher for a large value of energization of said restraint windings than the ratio for a lower value of energization of said restraint windings.

8. In a differential relay, a plurality of restraint windings, operating means including a magnetic core and a winding for said magnetic core connected for energization in accordance with the difference in currents traversing said restraint windings, said magnetic core having a lower magnetic permeability for a high value of energization of the winding for said magnetic core than for a lower value of energization thereof within the range of operation of said relay, and control means responsive to the combined conditions of said restraint windings and operating means.

9. In a protective arrangement for an alternating current system having a plurality of terminals through which current normally enters and leaves said system, current transformer means associated with said terminals, a differential relay having restraint means and operating means, and means including said current transformer means for energizing said restraint means in accordance with currents flowing in said terminals and for energizing said operating means in accordance with current flowing to a fault occurring in said system, said relay being proportioned to provide a ratio of the energization of said operating means to the energization of said restraint means required for an operation of said differential relay which is larger for a higher energization of said restraint means than the ratio for a lower energization of said restraint means.

10. In a protective arrangement for an alternating current system having a plurality of terminals through which current normally enters and leaves said system, a current transformer associated with each of said terminals, and a relay having restraint windings connected for energization in accordance with currents flowing in said terminals and having an operating winding connected for energization from said current transformers normally in accordance with the difference between currents entering said system and currents leaving said system through said terminals, said relay being proportioned to provide a ratio of energization of said operating winding to energization of said restraint windings necessary to effect a predetermined operation of said relay which is greater for a large value of energization of said restraint windings than for a smaller value of energization of said restraint windings.

11. In a protective arrangement for an alternating current system having a plurality of terminals through which current normally enters and leaves said system, a current transformer for each of said terminals, a plurality of restraint windings, said current transformers and said restraint windings being connected in a parallel circuit each branch of which contains one of said current transformers and one of said restraint windings connected in series, operating means connected across said parallel circuit for energization in accordance with the difference in currents traversing branches of said parallel circuit, and control means responsive to the combined conditions of said restraint windings and operating means, said operating means including a saturating magnetic device for providing a ratio of the energization of said operating means to the energization of said restraint windings necessary to effect a predetermined operation of said control means which is greater for a large value of energization of said restraint windings than for a lower value thereof.

12. In a differential relay, operating means operable when energized to effect a predetermined control operation, and restraint means operable when energized to restrain operation of said operating means, said means being proportioned to provide a ratio of the energization of said operating means to the energization of said restraint means necessary to effect an operation of said relay having a substantially constant value over a substantial range of energization of said restraint means, said ratio being larger than said constant value for energization of said restraint means above said substantial range.

13. In a differential relay, a plurality of restraint windings, an operating winding connected for energization in accordance with the difference in currents traversing said restraint windings, control means responsive to the combined conditions of said restraint and operating windings, and a saturating magnetic device associated with said operating winding to provide a ratio of the energization of said operating winding to the energization of said restraint windings necessary to effect a predetermined operation of said control means having a substantially constant value over a substantial range of energization of said restraint windings, said ratio being larger than said constant value for energization of said restraint windings above said range.

14. In a protective arrangement for an alternating current system having a plurality of terminals through which current normally enters and leaves said system, current transformer means associated with said terminals, a differential relay having restraint means and operating means, and means including said current transformer means for energizing said restraint means in accordance with currents flowing in said terminals and for energizing said operating means in accordance with current flowing to a fault occurring in said system, said relay being proportioned to provide a ratio of the energization of said operating means to the energization of said restraint means required for an operation of said differential relay having a substantially constant value over a substantial range of energization of said restraint means, said ratio being larger than said constant value for energization of said restraint means above said range.

15. In a protective arrangement for an alternating current system having a plurality of terminals through which current normally enters and leaves said system, a current transformer associated with each of said terminals, and a relay having restraint windings connected for energization in accordance with currents flowing in said terminals and having an operating winding connected for energization from said current transformers normally in accordance with the difference between currents entering said system and currents leaving said system through said terminals, and a saturating magnetic device associated with one of said windings to provide a ratio of energization of said operating winding to energization of said restraint windings necessary to effect a predetermined operation of said relay having a substantially constant value over a substantial range of energization of said restraint windings, said ratio being larger than said constant value for energization of said restraint windings above said range.

16. In a protective arrangement for an alternating current system having a plurality of terminals through which current normally enters and leaves said system, a current transformer for each of said terminals, a plurality of restraint windings, said current transformers and said restraint windings being connected in a parallel circuit each branch of which contains one of said current transformers and one of said restraint windings connected in series, operating means connected across said parallel circuit for energization in accordance with the difference in currents traversing branches of said parallel circuit, and control means responsive to the combined conditions of said restraint windings and operating means, said operating means including a saturating transformer to provide a ratio of the energization of said operating means to the energization of said restraint windings necessary to effect a predetermined operation of said control means having a substantially constant value over a substantial range of energization of said restraint windings, said ratio being larger than said constant value for energization of said restraint windings above said range.

17. In a protective arrangement for an alternating current system having a plurality of terminals through which currents normally enter and leave said system; a current transformer for each of said terminals; a differential relay comprising control means, operating means effective when energized for operating said control means, and restraint means effective when energized for opposing operation of said control means; means for energizing said restraint means from said current transformers in accordance with currents flowing through said terminals; and means for energizing said operating means from said current transformers in accordance with the difference between current entering and leaving said system through said terminals, said differential relay being designed to require a ratio of energization of said operating means to energization of said restraint means for effecting an operation of said control means which is substantially constant over a substantial range of currents flowing in said terminals under normal operating conditions of said system, said ratio increasing for abnormally high values of currents flowing through said terminals.

WILLIAM K. SONNEMANN.
WILLIAM A. LEWIS, Jr.